United States Patent
Zhou et al.

(10) Patent No.: US 8,315,295 B2
(45) Date of Patent: Nov. 20, 2012

(54) METHOD AND APPARATUS FOR DESIGNING MODULATION AND CODING SET OF COMMUNICATION SYSTEM

(75) Inventors: Hua Zhou, Beijing (CN); Jun Tian, Beijing (CN); Yuantao Zhang, Beijing (CN); Jinyin Xue, Beijing (CN)

(73) Assignee: Fujitsu Limited, Kawasaki (JP)

(*) Notice: Subject to any disclaimer, the term of this patent is extended or adjusted under 35 U.S.C. 154(b) by 639 days.

(21) Appl. No.: 12/486,574

(22) Filed: Jun. 17, 2009

(65) Prior Publication Data

US 2009/0323792 A1 Dec. 31, 2009

(30) Foreign Application Priority Data

Jun. 27, 2008 (CN) .......................... 2008 1 0131903

(51) Int. Cl.
*H04B 17/00* (2006.01)

(52) U.S. Cl. ........ 375/224; 375/225; 375/227; 375/260; 375/267; 375/295; 375/299; 375/340; 455/67.13; 455/69; 455/101; 455/132; 455/500; 455/562.1; 370/210; 370/334; 370/437; 341/173; 341/180

(58) Field of Classification Search .................. 375/224, 375/225, 227, 260, 267, 295, 299, 340; 455/67.13, 455/69, 101, 132, 500, 562.1; 370/210, 334, 370/437; 341/173, 180
See application file for complete search history.

(56) References Cited

U.S. PATENT DOCUMENTS

| 6,751,187 | B2* | 6/2004 | Walton et al. ................. 370/210 |
| 2009/0245337 | A1* | 10/2009 | Ramachandran et al. .... 375/224 |
| 2010/0278225 | A1* | 11/2010 | Chun et al. .................... 375/224 |

OTHER PUBLICATIONS

IEEE P802.16e/D12-Draft IEEE Standard for Local and Metropolitan area Networks—Part 16: Air Interface for Fixed and Mobile Broadband Wireless Access Systems—Amendment 2: Physical and Medium Access Control Layers for Combined Fixed and Mobile Operation in Licensed Bands and Corrigendum 1, Institute of Electrical and Electronic Engineers, New York, NY, USA, Oct. 2005.

(Continued)

*Primary Examiner* — Leon Flores
(74) *Attorney, Agent, or Firm* — Murphy & King, P.C.

(57) ABSTRACT

The present invention provides method and apparatus for designing modulation and coding set of communication System. The method for designing modulation and coding set designs a proper set of modulation and coding schemes (MCS), based on probability distribution of the quality of received signal in the communication system, so as to optimize the whole performance of the communication system. The method comprises the steps of: acquiring the probability distribution of the quality of the received signal in the communication system; performing a calculation on the target performance of the communication system based on the acquired probability distribution of the quality of the received signal and a plurality of MCSs, to design a proper set of MCSs for the communication system, so that a region where the probability of the quality of the received signal appears more frequently are provided with more levels of the MCSs.

8 Claims, 5 Drawing Sheets

OTHER PUBLICATIONS

Harsini and Lahouti. Optimized Link Adaptation for Wireless Packet Communications Based on Discrete-Rate Modulation and Coding Schemes, Signal Processing Advances in Wireless Communications IEEE 2007.

T.Sampei, S. Morinaga. Symbol Rate and Modulation Level Controlled Adaptive Modulation/TDMA/TDD for Personal Communication Systems, IEEE VTC 1995.

Rohling and Grunheid R. Adaptive coding and modulation in an OFDM-TDMA communication system, IEEE VTC 1998.

First Notification of Chinese Office Action dated Feb. 13, 2012 received in Patent Application No. 200810131903.8.

Chinese Second Office Action dated Jun. 13, 2012 issued in application No. 200810131903.8.

* cited by examiner

METHOD AND APPARATUS FOR DESIGNING MODULATION AND CODING SET OF COMMUNICATION SYSTEM

TECHNICAL FIELD

The present invention relates to a design of modulation and coding set of communication system, and more particularly, to method and apparatus for designing modulation and coding set of communication system, which enable achieving an optimum system performance, such as system throughput.

BACKGROUND ART

The transmission reliability of any communication system is surely reduced due to the influence of the transmission medium. In order to improve the transmission reliability, modulation-demodulation and channel coding-decoding are usually required to be designed for the receiving and transiting ends, especially in the wireless transmission system.

Each modulation and coding scheme (MCS) combination has a corresponding spectral efficiency, e.g., the combination of a QPSK modulation and a convolution code or Turbo code with a code rate of ½ can achieve a transmission efficiency of 1 bit/symbol. Multiple MCS combinations can be achieved by changing the modulation order (QPSK, M-PSK, 16QAM, M-QAM, etc.) and the code rate (½, ⅔, ¾, etc.). Different MCSs can be applied to different transmission environments. E.g., a channel of a good transmission environment can transmit more information with the MCS of a higher spectral efficiency; whereas a channel of a poor transmission environment can transmit less information with the MCS of a lower spectral efficiency, so as to ensure the transmission quality.

Generally, in a communication system, the transmission conditions can be indicated by the received signal to interference plus noise ratio (SINR). Of course, the channel quality can also be indicated with other indexes. Under a given SINR, in order to meet certain transmission requirement, such as that the transmission error rate is below certain threshold (e.g., 10% block error rate (BLER)), the MCS of a spectral efficiency as high as possible may be selected. Each MCS has a different BLER under a different SINR, and this can be indicated with a BLER-SINR graph. The transmission throughput of the system can be improved as far as possible by selecting different MCSs in accordance with different received SINRs, and this technique is called as adaptive MCS selection. The variation range of the received SINR depends on many factors, such as system configuration, transmission medium distribution, user state change in system service, etc. Taking the cellular mobile wireless communication system as an example, a user close to a base station experiences less wireless signal transmission attenuation, and the received SINR is higher, while a user far from the base station experiences more signal attenuation, and the received SINR is lower; with respect to a cellular system having a reuse factor of 1 in multiple base stations, a user at the edge of the cell is interfered by a non-service base station, thus the SINR is lower than that of a user at the cell center. In a word, the magnitude of the received SINR to each user depends on factors such as system configuration, user state, etc. Statistically, the magnitude of the received SINR to a user can be indicated by probability distributions, such as cumulate density function (CDF) or probability density function (PDF). From those distribution curves, the variation range of the user SINR in the system can be approximately known.

In order to utilize the system capacity as far as possible, an adaptive MCS selection shall reflect the condition of the current transmission channel, i.e., to select a MCS of a spectral efficiency as high as possible, which meets the BLER requirement, under the current received SINR value. Of course, the receiving end shall, in certain way, inform the transmitting end of the selected MCS, so that the transmitting end can transmit correctly. As transmitting MCS message also occupies the transmission channel, the number of MCS combinations supported by the system shall be limited, and many communication standards specify MCS combinations supported both by the transmitting and receiving parties. For instance, IEEE 802.16E [1] specifies the following 11 MCS combinations: QPSK ½ with a repetition factor of 6, QPSK ½ with a repetition factor of 4, QPSK ½ with a repetition factor of 2, QPSK ½, QPSK ¾, 16 QAM ½, 16 QAM ¾, 64 QAM ½, 64 QAM ⅔, 64 QAM ¾, and 64 QAM ⅚.

The current research mainly discusses designing the MCS structure under a given spectral efficiency, namely designing the modulation scheme and the coder structure, so that the BLER-SINR curve is more steep, i.e., the BLER is smaller under the given SINR. However, in an aspect of system design, when a number of MCS combinations is given, how to design the MCS and spectral efficiency level (i.e., which MCS and spectral efficiency level are to be supported by the system), so that the system capacity is maximized, is very important for improving the whole performance of the communication system.

The references of the present application are listed as follows, and incorporated herein by reference, as described detailedly in the Description.

1. [Non-patent literature 1]: IEEE P802.16e/D12—Draft IEEE Standard for Local and Metropolitan area Networks—Part 16: Air Interface for Fixed and Mobile Broadband Wireless Access Systems—Amendment for Physical and Medium Access Control Layers for Combined Fixed and Mobile Operation in Licensed Bands, Institute of Electrical and Electronic Engineers, New York, N.Y., USA, October 2005, 2. [Non-patent literature 2]: Harsini and Lahouti. Optimized link adaptation for wireless packet communications based on discrete-rate modulation and coding schemes, Signal Processing Advances in Wireless Communications IEEE 2007, 3. [Non-patent literature 3]: T. Sampei, S. Morinaga. Symbol rate and modulation level controlled adaptive modulation/TDMA/TDD for personal communication systems, IEEE VTC 1995, 4. [Non-patent literature 4]: Rohling and Grunheid R. Adaptive coding and modulation in an OFDM-TDMA communication system, IEEE VTC 1998.

SUMMARY OF THE INVENTION

With respect to the above problems of the prior art, the present invention provides a method for MCS level design based on probability method, for an object of improving the system throughput. The method of the invention can determine MCS levels to be supported by the system when designing the communication system, or revise the existing MCS levels when configurations of the communication system are changed, so as to sufficiently utilize the system capacity.

With the final design object of improving the system throughput, the present invention selects the MCS set suitable for the current system configuration, by combining error performance curves at different MCS levels and corresponding spectral efficiencies, and the probability distribution of received signal qualities under different system configurations, and directs selecting concrete MCS scheme, including corresponding modulation method and coding method. The method of the present invention can determine MCS levels to be supported by the system when designing the communication system, or revise the existing MCS levels when configurations of the communication system are changed, so as to sufficiently utilize the system capacity.

A first aspect of the invention provides a method of designing a set of MCSs for use in a communication system, in accordance with probability distribution of quality of a received signal in the communication system, wherein the method comprises the steps of: acquiring the probability distribution of the quality of the received signal in the communication system; performing a calculation on the target performance of the communication system based on the acquired probability distribution of the quality of the received signal and a plurality of MCSs via traversing various possible sets of MCSs selected from the plurality of MCSs, to design a proper set of MCSs for the communication system, so that a region where the probability of the quality of the received signal appears more frequently are provided with more levels of the MCSs.

According to the above method, wherein the quality of the received signal is a SINR of the received signal.

According to the above method, wherein the probability distribution of the quality of the received signal is acquired via system simulation before a network of the communication system is actually deployed, or via actual path test after the network of the communication system is deployed.

According to the above method, wherein the calculation on system throughput of the communication system is performed on the basis of the acquired probability distribution of the SINR of the communication system and an error performance curve of each of a plurality of predetermined MCSs via traversing the various possible sets of MCSs selected from the plurality of predetermined MCSs, so as to select the proper set of MCSs for use in the communication system.

According to the above method, wherein the proper set of MCSs is designed for the communication system by performing a calculation on the system throughput of the communication system expressed by the following equation:

$$T = x_0 \int_{-\infty}^{S_0} BLER(x_0, p) f(p) dp + \sum_{i=0}^{M-2} x_i \int_{S_i}^{S_{i+1}} BLER(x_i, p) \cdot f(p) dp + x_{M-1} \int_{S_{M-1}}^{+\infty} BLER(x_{M-1}, p) f(p) dp$$

where p is a value of the SINR, f(p) is a probability distribution function of the SINR, xi is a spectrum efficiency of the ith MCS, i is an integer smaller than M, $BLER(x_i,p)$ is a block error rate with regard to the ith MCS and the value p of the SINR, T indicates the system throughput of the communication system, parameters $S_i$ and $S_{i+1}$ are so selected that BLER $(x_i,s_i) \leq$ BLER_Threshold and $BLER(x_{i+1},s_{i+1}) \geq$ BLER_ Threshold, and BLER_Threshold is a threshold selected in accordance with system demand.

According to the above method, wherein the method further comprising the steps of: based on a plurality of designated spectrum efficiencies, designing a plurality of MCSs corresponding to the respective spectrum efficiencies; acquiring an error performance curve of each MCS via simulation; and performing a calculation on the target performance of the communication system based on the probability distribution of the quality of the received signal and the acquired error performance curve of the MCS via traversing all possible spectrum efficiencies and corresponding MCSs to select the proper set of MCSs for the communication system.

A second aspect of the invention provides an apparatus of designing a set of MCSs for the communication system, in accordance with the probability distribution of quality of the received signal in the communication system, wherein the apparatus comprises: a received signal quality acquiring means, for acquiring the probability distribution of the quality of the received signal of the communication system; and a MCS set designing means, for performing a calculation on the target performance of the communication system based on the acquired probability distribution of the quality of the received signal and a plurality of MCSs via traversing various possible sets of MCSs selected from the plurality of MCSs, to design a proper set of MCSs for the communication system, so that a region where the probability of the quality of the received signal appears more frequently are provided with more levels of the MCSs.

According to the above apparatus, wherein the MCS set designing means comprises: a MCS designing unit, for designating a plurality of MCSs corresponding to respective spectrum efficiencies; an error performance curve acquiring unit, for acquiring an error performance curve of each MCS via simulation; and a MCS set selecting unit, for performing a calculation on the target performance of the communication system based on the probability distribution of the quality of the received signal and the acquired error performance curve of the MCS via traversing all possible spectrum efficiencies and corresponding MCSs to select the proper set of MCSs for the communication system.

A third aspect of the invention provides a computer program. When the computer program is loaded into a computer and executed by the computer, the method of the invention mentioned above for designing the MCS set for use in the communication system can be realized.

A fourth aspect of the invention provides a computer-readable record medium containing the above computer program. The computer-readable record medium can be read by the computer to load the computer program therein to the computer and then executed by the computer, so as to realize the method of the invention mentioned above for designing the MCS set for use in the communication system.

These and other aspects of the invention will be clear by referring to the following descriptions and drawings. In the descriptions and drawings, the embodiments of the invention are disclosed in details to indicate some ways for implementing the invention, but it shall be understood that the range of the invention is not limited thereby. On the contrary, the present invention includes all changes, modifications and equivalents, which fall into the range of sprit and connotation of the attached claims.

Features described and/or illustrated with respect to one embodiment, can be used in the same or similar way in one or more other embodiments, and/or be combined with or replace features of other embodiments.

To be emphasized, the word "comprising/comprise(s)" is used in the Description to indicate the existence of the features, integers, steps or compositions, but it does not exclude the existence or addition of one or more other features, integers, steps, compositions, or their combinations.

BRIEF DESCRIPTION OF THE DRAWINGS

The drawings are provided for further understanding of the present invention, and constitute a part of the Description. The drawings illustrate the preferred embodiments of the present invention, and explain the principle of the present invention in conjunction with the textual descriptions, in which.

DETAILED DESCRIPTION OF THE EMBODIMENTS

In a communication system, there are many MCS levels supported by both the transmitting and receiving parties. As mentioned previously, combinations of different modulation methods and channel coding schemes of different code rates can produce a plurality of MCS levels of different spectral efficiencies.

The present invention mainly solves two problems. One problem is to select a proper MCS set from known MCSs, so as to maximize the overall performance (system throughput) of the communication system. The other problem is to design a new MCS set for a new communication system or communication system with its configuration changed, so as to maximize the overall performance (system throughput) of the communication system.

For this purpose, the probability distribution of received signal SINRs at the receiving end of the system shall be calculated. The probability distribution of received signal SINRs is acquired, e.g., via system simulation before a network of the communication system is actually deployed, or via actual path test after the network of the communication system is deployed. In order to reflect the actual conditions, user received signal SINRs under different base stations shall be counted.

Figure 1:
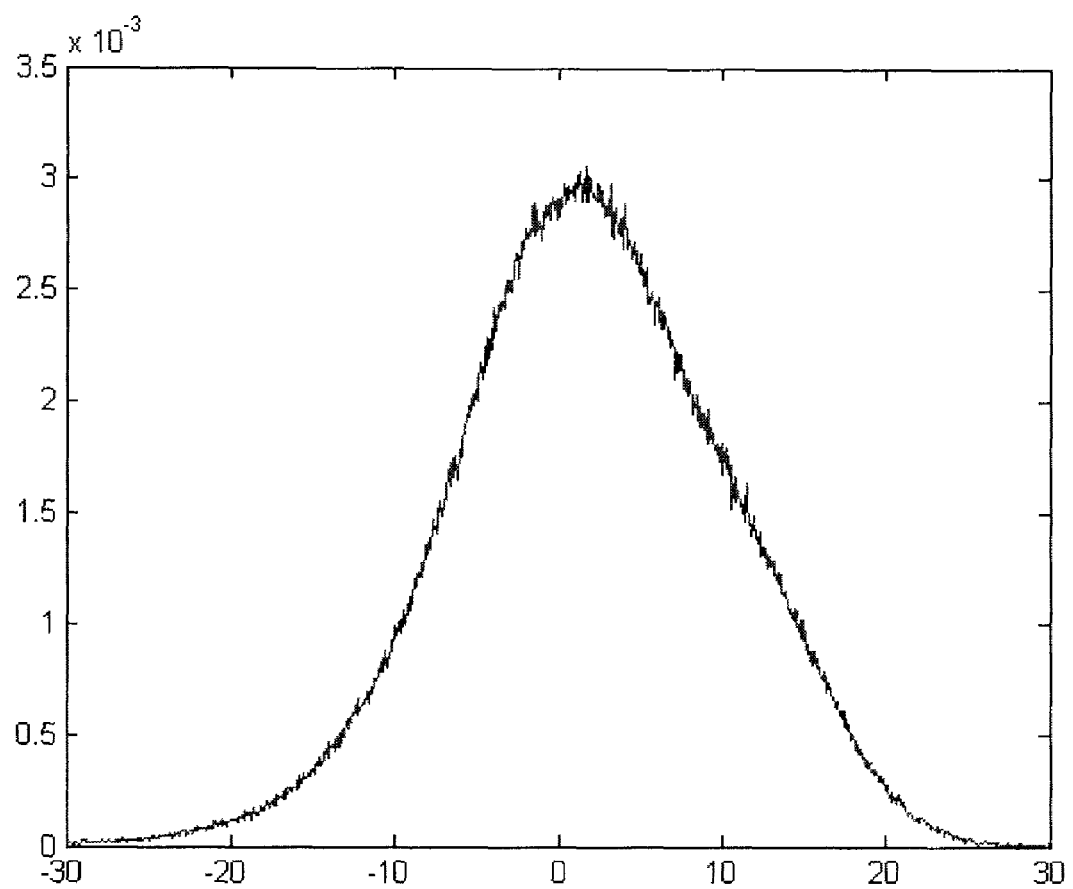
FIG. 1 is a diagram indicating probability distribution of received signal SINRs in a communication system acquired via simulation.

FIG. 1 illustrates a probability distribution diagram of received signal SINRs acquired via system simulation. As shown in the figure, the appearance probabilities of different SINRs are also different. In this example, the appearance probabilities of SINRs in an intermediate range are relatively high. Of course, with respect to different network configurations, the probability distributions of received signal SINRs are also different. The figure is taken as an example to describe how to design MCS levels so that the capacity of the communication system can be maximized, as follows:

In general, the received SINRs vary in a large range, as shown in FIG. 1, the variation range of SINR may be from −30 dB to +30 dB. Meanwhile, it shall be noted that the probabilities of SINRs appearing in an intermediate range (−10~10 dB) are relatively high, because in the cellular wireless communication system, each user is certainly covered by certain service base station, thus the variation ranges of SINRs of most users are not very large. Therefore, we can consider optimizing MCS levels based on variation characteristics of the SINRs.

In brief, a region having higher appearance probabilities of SINRs can be provided with more MCSs levels, while a region having lower appearance probabilities of SINRs can be provided with less MCSs levels. That is, when the SINRs are not evenly distributed, corresponding MCS levels are also designed to be unevenly distributed; while when the SINRs are evenly distributed, the MCS levels are also designed to be evenly distributed. Thus the object of maximizing the system capacity is achieved by matching the MCS level design with the SINR distribution.

Figure 2:
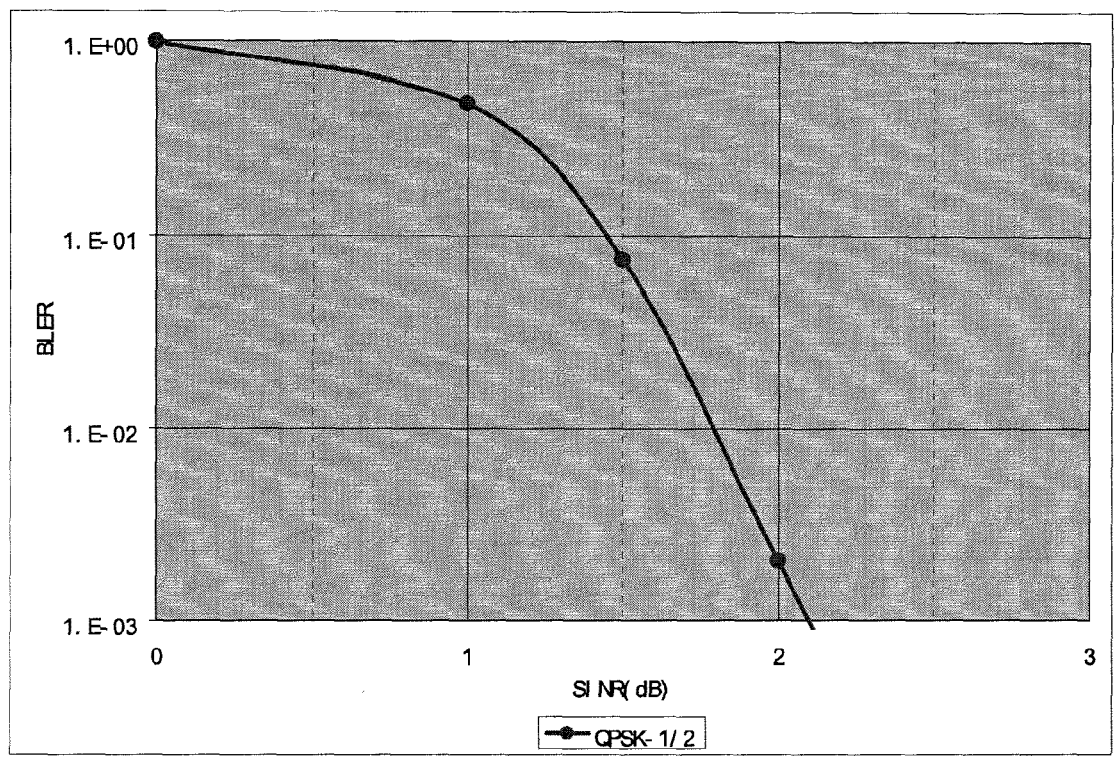
FIG. 2 is an error code performance curve indicating relationship between BLER and SINR of a MCS.

Our method is described via simple equation calculations as follows. It is assumed that there are M MCS levels being supportable in the system (as mentioned above, transmitting MCS message will occupy the transmission channel, thus the number of MCS levels shall be limited). It is assumed that the parameter to be designed is to search spectral efficiency set $\{x_i\}_M$, wherein $x_i$ is the spectral efficiency corresponding to the $i^{th}$ MCS level $MCS_i$. The MCS for achieving each spectral efficiency has a corresponding error code performance curve, which can be represented as a function of SINR, as shown in FIG. 2.

The optimization object is to maximize the following equation (1):

$$T = x_0 \int_{-\infty}^{S_0} BLER(x_0, p)f(p)dp + \sum_{i=0}^{M-2} x_i \int_{S_i}^{S_{i+1}} BLER(x_i, p) \cdot f(p)dp + x_{M-1} \int_{S_{M-1}}^{+\infty} BLER(x_{M-1}, p)f(p)dp,$$

where p is a value of the SINR, f(p) is a probability distribution function of the SINR, $BLER(x_i, p)$ is a BLER with regard to the given $MCS_i$ and the value p of the SINR, parameters $S_i$ and $S_{i+1}$ are selected so that $BLER(x_i, s_i) \leq BLER\_Threshold$ and $BLER(x_{i+1}, s_{i+1}) \geq BLER\_Threshold$, and BLER_Threshold can be selected in accordance with the system demand (e.g., some systems demand 10%). The parameters to be optimized are $BLER(x_i, p)$ and $\{x_i\}_M$, the optimization can be carried out by using the general optimization technique, or by simplifying the above equation, and the details are not described herein.

Figure 3:
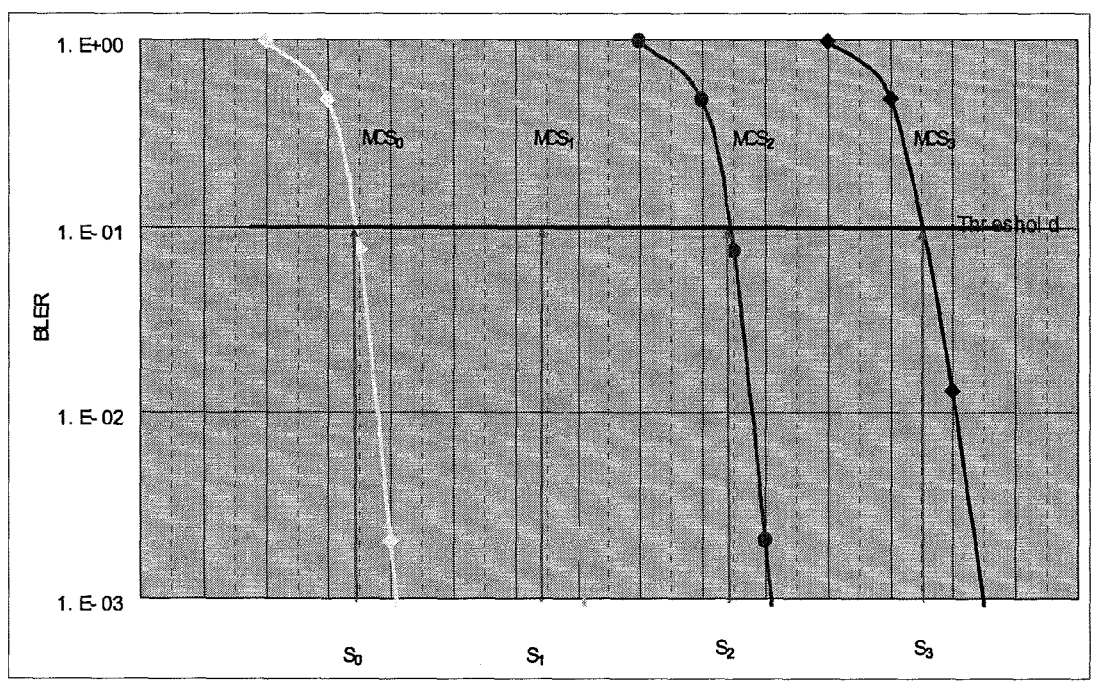
FIG. 3 illustrates BLER curves of four MCS levels.

Next, our method is illustrated by assuming M=4. FIG. 3 illustrates the BLER curve of four MCS levels (the BLER curve can be changed by designing concrete MCS). The optimization can be represented in the following equation (2):

$$T = x_0 \int_{-\infty}^{S_0} BLER(x_0, p)f(p)dp + x_0 \int_{S_0}^{S_1} BLER(x_0, p)f(p)dp + x_1 \int_{S_1}^{S_2} BLER(x_1, p)f(p)dp + x_2 \int_{S_2}^{S_3} BLER(x_2, p)f(p)dp + x_3 \int_{S_3}^{+\infty} BLER(x_3, p)f(p)dp$$

The above problem can be solved via traversing search method. The parameters to be optimized are different spectral efficiency sets $\{x_i\}_M$, and corresponding BLER $(x_i, p)$ curve under each spectral efficiency. As the BLER $(x_i, p)$ curve is related to concrete MCS, e.g., in some systems, different spectral efficiencies are achieved only by changing puncture schemes of the coder, and different puncture schemes lead to different BLER curves. In this way, we can calculate the system throughput under corresponding spectral efficiency set, by changing the spectral efficiency and the produced BLER curve. The spectral efficiency set and MCS leading to the maximum system throughput is selected from various sets, and that is the optimum MCS set under the system configuration.

Figure 4:
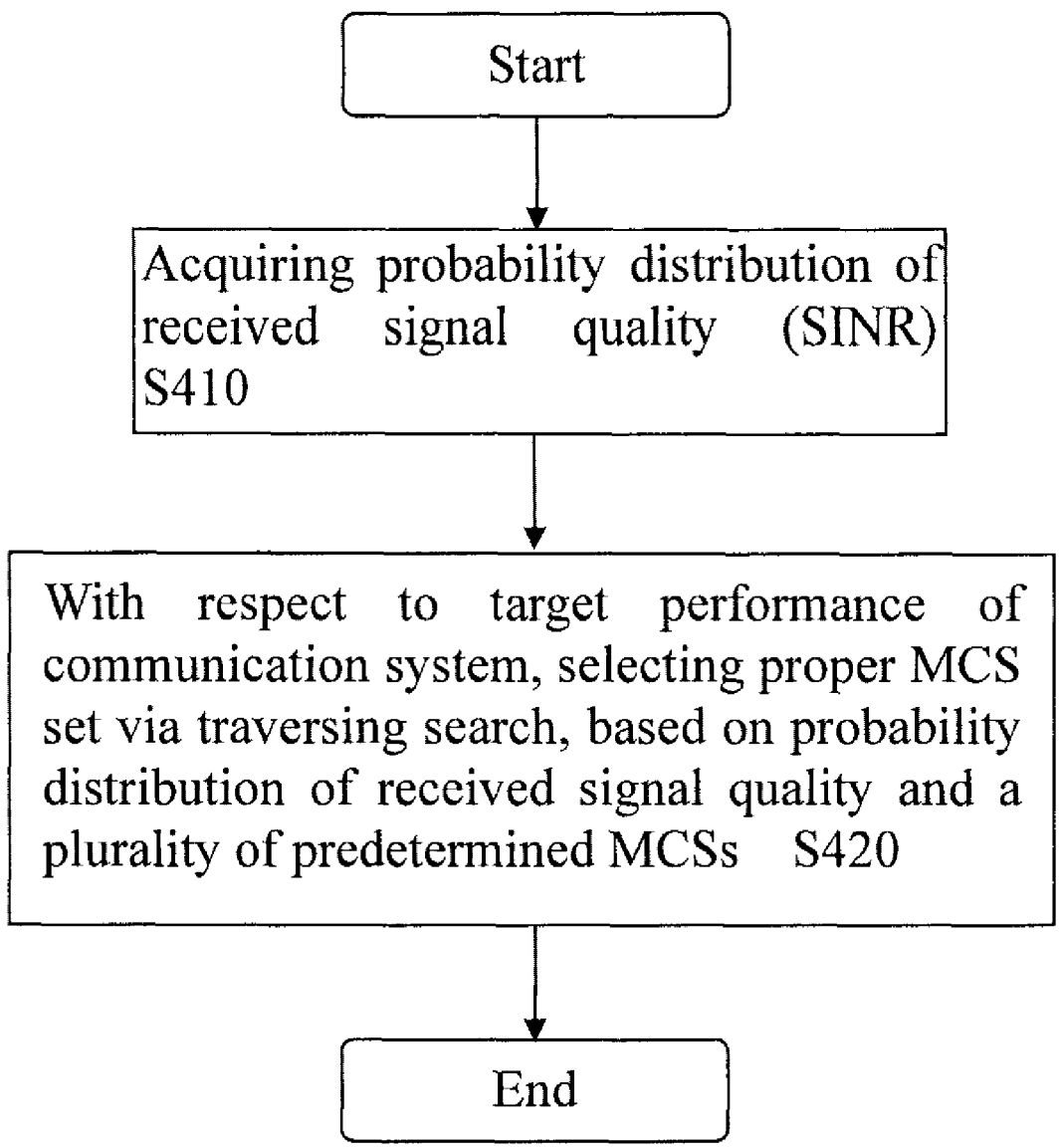
FIG. 4 is a flow chart indicating an entire process of the method for a MCS set design in one embodiment of the invention.
Figure 5:
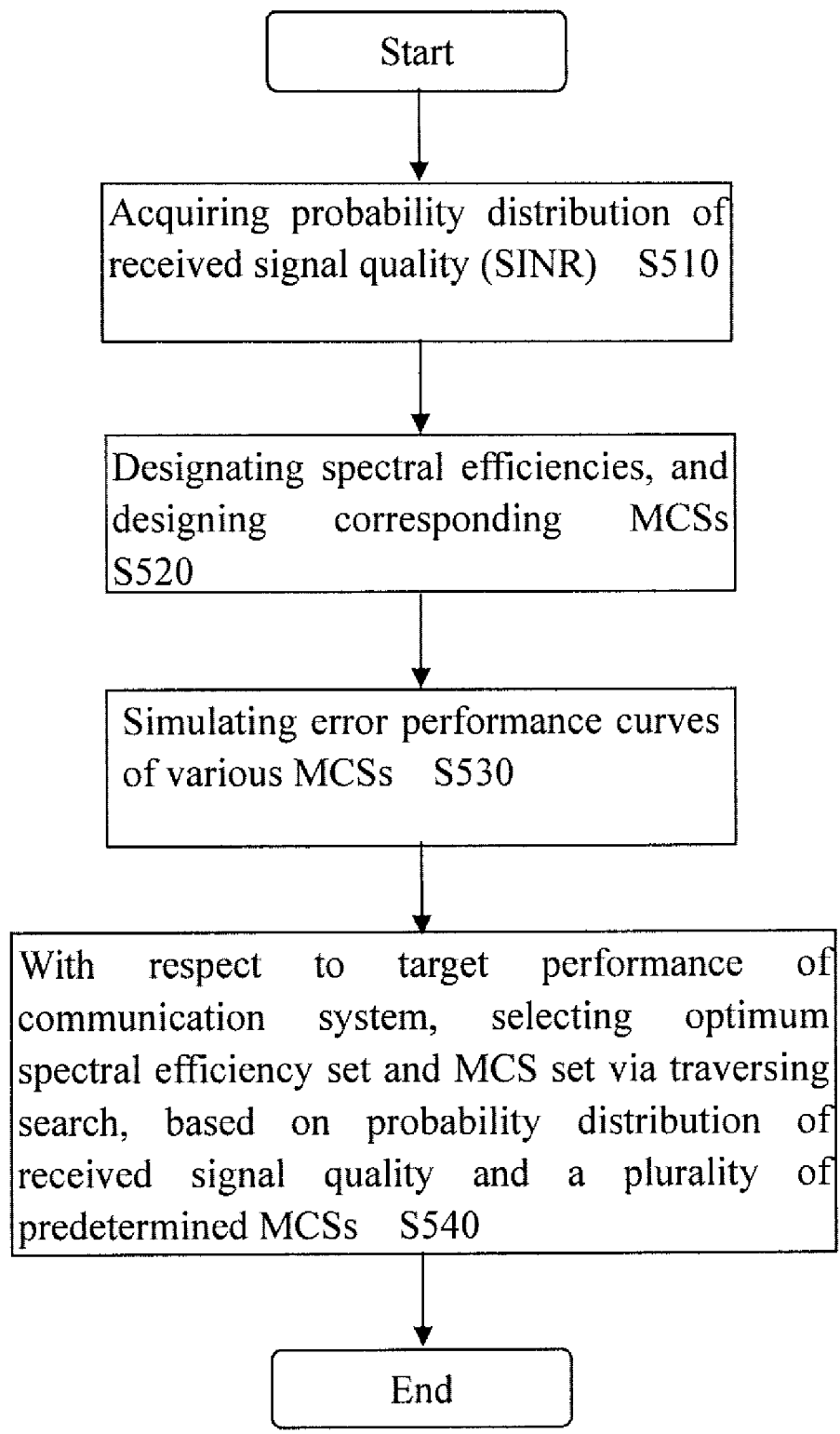
FIG. 5 is a flow chart indicating an entire process of the method for a MCS set design in another embodiment of the invention.

Next, the method for designing MCS set in communication system of the present invention is described by referring to FIGS. 4 and 5. FIG. 4 illustrates a method for selecting a proper MCS set from a plurality of predetermined MCSs, while FIG. 5 illustrates a method for designing a completely new MCS set.

As shown in FIG. 4, in step S410, firstly, the probability distribution of received signal SINR of the communication system via system simulation or actual path test. To be noted, other quality index of received signal also can be used.

Next, in step S420, selecting a proper MCS set from the plurality of predetermined MCSs according to the previously mentioned calculation method, based on the acquired received signal SINR. In details, selecting various possible MCS sets from the plurality of MCSs, with respect to the required number of MCS levels. For each of the selected MCS sets, the system throughput is calculated via equation (1). Wherein the MCS set maximizing the system throughput is the MCS set finally to be used.

In addition, for a new communication system, a new and suitable MCS set can be designed according to the method of the invention.

Referring to FIG. 5, firstly, in step S510, obtaining the probability distribution of received signal SINR of the communication system via system simulation or actual path test. To be noted, other quality index of received signal also can be used.

Next, in step S520, designating a group of spectral efficiencies, and with respect to these spectral efficiencies, designing corresponding MCSs respectively. To be noted, designing corresponding MCS based on spectral efficiency is a prior art in the field, instead of a key of the invention, and hence is not described detailedly herein.

Next, in step S530, simulating error performance curves of respective MCSs.

Next, in step S540, calculating the system throughput via equation (1), based on the probability distribution of SINRs acquired in step S510 and the error performance curves acquired in step S530. The calculation is performed by traversing all possible spectral efficiencies and corresponding designed MCSs, and searching the spectral efficiency set and MCS set maximizing the calculated system throughput. Thus a proper spectral efficiency level and MCS level are designed for the communication system.

The above MCS design method of the invention used in communication system is adaptable to any multiple-access communication system, broadcast/multicast/unicast communication system, which can be based on any multiple-access technique, such as OFDMA, CDMA and TDMA.

Although the present invention is only illustrated with the preferred embodiments, on the basis of the disclosure herein, persons skilled in the art can easily make various changes and modifications without departing from the scope of invention as defined in the attached claims. The descriptions of the above embodiments are only exemplary, and do not constitute limitations to the invention defined by the attached claims and their equivalents.

What is claimed is:

1. A method of designing a set of modulation and coding schemes for use in a communication system in accordance with probability distribution of quality of a received signal in the communication system, the method comprising: acquiring, in an apparatus, the probability distribution of the quality of the received signal in the communication system; and performing, in the apparatus, calculation on the target performance of the communication system based on the acquired probability distribution of the quality of the received signal and a plurality of modulation and coding schemes via traversing various possible sets of modulation and coding schemes selected from the plurality of modulation and coding schemes to design a set of modulation and coding schemes for maximizing the overall performance of the communication system, so that a range having higher appearance probabilities of the quality of the received signal are provided with more levels of the modulation and coding schemes than another range having lower appearance probabilities of the quality of the received signal; wherein the calculation on the target performance of the communication system is performed on the basis of the acquired probability distribution of the signal to interference plus noise ratio of the communication system and an error performance curve of each of a predetermined plurality of predetermined modulation and coding schemes.

2. The method according to claim 1, wherein the quality of the received signal is a signal to interference plus noise ratio of the received signal.

3. The method according to claim 2, wherein the calculation on system throughput of the communication system is performed via traversing the various possible sets of modulation and coding schemes selected from the predetermined plurality of modulation and coding schemes, so as to select the proper set of modulation and coding scheme for use in the communication system.

4. The method according to claim 3, wherein the proper set of modulation and coding schemes is designed for the communication system by performing calculation on the system throughput of the communication system expressed by the following equation:

$$T = x_0 \int_{-\infty}^{S_0} BLER(x_0, p)f(p)dp + \sum_{i=0}^{M-2} x_i \int_{S_i}^{S_{i+1}} BLER(x_i, p) \cdot f(p)dp + x_{M-1} \int_{S_{M-1}}^{+\infty} BLER(x_{M-1}, p)f(p)dp,$$

where p is a value of the signal to interference plus noise ratio, f(p) is a probability distribution function of the signal to interference plus noise ratio, M is a number of modulation and coding schemes being supportable by the communication system, $x_i$ is a spectrum efficiency of the ith modulation and coding scheme, i is an integer smaller than M, $BLER(x_i,p)$ is a block error rate with regard to the ith modulation and coding scheme and the value p of the signal to interference plus noise ratio, T indicates the system throughput of the communication system, parameters $S_i$ and $S_{i+1}$ are so selected that $BLER(x_i,s_i) \leq BLER\_Threshold$ and $BLER(x_{i+1},s_{i+1}) \geq BLER\_Threshold$, and BLER_Threshold is a threshold value selected in accordance with system demand.

5. The method according to claim 1, wherein the probability distribution of the quality of the received signal is acquired via system simulation before a network of the communication system is actually deployed, or via actual path test after the network of the communication system is deployed.

6. The method according to claim 1, further comprising: designating a plurality of spectrum efficiencies, and designing a plurality of modulation and coding schemes corresponding to each of the plurality of spectrum efficiencies; acquiring an error performance curve of each modulation and coding scheme via simulation; and performing calculation on the target performance of the communication system via traversing all possible spectrum efficiencies and modulation and coding schemes corresponding thereto to select the proper set of modulation and coding schemes for the communication system.

7. An apparatus of designing a set of modulation and coding schemes for use in a communication system in accordance with probability distribution of quality of a received signal in the communication system, the apparatus comprising: a received signal quality acquiring means, for acquiring the probability distribution of the quality of the received signal in the communication system; and a modulation and coding scheme set designing means, for performing calculation on the target performance of the communication system based on the acquired probability distribution of the quality of the received signal and a plurality of modulation and coding schemes via traversing various possible sets of modulation and coding schemes selected from the plurality of modulation and coding schemes to design a set of modulation and coding schemes for maximizing the overall performance of the communication system, so that a range having higher appearance probabilities of the quality of the received signal are provided with more levels of the modulation and coding schemes than another range having lower appearance probabilities of the quality of the received signal; wherein the calculation on the target performance of the communication system is performed on the basis of the acquired probability distribution of the signal to interference plus noise ratio of the communication system and an error performance curve of each of a predetermined plurality of predetermined modulation and coding schemes.

8. The apparatus according to claim 7, wherein the modulation and coding scheme set designing means comprises: a modulation and coding scheme designing unit, for designating a plurality of spectrum efficiencies and designing a plurality of modulation and coding schemes corresponding to each of the plurality of spectrum efficiencies; an error performance curve acquiring unit, for acquiring an error performance curve of each modulation and coding scheme via simulation; and a modulation and coding scheme set selecting unit, for performing calculation on the target performance of the communication system via traversing all possible spectrum efficiencies and modulation and coding schemes corresponding thereto to select the proper set of modulation and coding schemes for the communication system.

* * * * *